US011208976B2

(12) United States Patent
Chen et al.

(10) Patent No.: US 11,208,976 B2
(45) Date of Patent: Dec. 28, 2021

(54) METHODS AND SYSTEMS FOR CONTROLLING A STOP/START ENGINE

(71) Applicant: Ford Global Technologies, LLC, Dearborn, MI (US)

(72) Inventors: Hanyang Chen, Canton, MI (US); Michael Irby, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 16/249,814

(22) Filed: Jan. 16, 2019

(65) Prior Publication Data

US 2020/0224626 A1    Jul. 16, 2020

(51) Int. Cl.
  *F02N 11/08*  (2006.01)
  *B60R 16/033*  (2006.01)
  *B60K 6/20*  (2007.10)

(52) U.S. Cl.
  CPC .......... *F02N 11/0825* (2013.01); *B60K 6/20* (2013.01); *B60R 16/033* (2013.01); *B60Y 2200/92* (2013.01); *B60Y 2300/192* (2013.01)

(58) Field of Classification Search
  CPC .......... F02N 11/0814; F02N 11/0818; F02N 11/0822; F02N 11/0825; F02N 2200/061; F02N 2200/064
  See application file for complete search history.

(56) References Cited

U.S. PATENT DOCUMENTS

| 7,501,791 | B2* | 3/2009 | Thimm | F02N 11/0825 320/104 |
| 8,989,935 | B2* | 3/2015 | Martin | F02D 29/02 701/22 |
| 9,828,964 | B1* | 11/2017 | Gabriel | F02N 11/0833 |
| 9,987,944 | B2 | 6/2018 | Dunlap et al. | |
| 2003/0132730 | A1* | 7/2003 | Ochiai | B60L 50/16 320/104 |
| 2004/0211381 | A1* | 10/2004 | Ogawa | F02N 11/084 123/179.4 |
| 2006/0021808 | A1* | 2/2006 | McGee | F02N 11/0862 180/65.235 |
| 2009/0043429 | A1* | 2/2009 | Minekawa | F01P 5/04 701/1 |
| 2009/0198438 | A1* | 8/2009 | Jinno | B60H 1/04 701/110 |
| 2014/0312626 | A1* | 10/2014 | Yamoto | H02J 7/1469 290/40 R |
| 2016/0114696 | A1 | 4/2016 | Eifert et al. | |

(Continued)

FOREIGN PATENT DOCUMENTS

| DE | 102012218737 A1 * | 4/2014 | ......... F02N 11/0825 |
| JP | 2006170128 A * | 6/2006 | |
| WO | WO-2009094367 A1 * | 7/2009 | ............. H02J 9/002 |

*Primary Examiner* — Michael A Kessler (74) *Attorney, Agent, or Firm* — Geoffrey Brumbaugh; McCoy Russell LLP (57) ABSTRACT

Systems and methods for improving operation of a vehicle are presented. In one example, a minimum battery state of charge (SOC) threshold for automatic engine stopping is adjusted responsive to a temperature of a battery. An engine of the vehicle may be automatically started responsive to a battery SOC discharge amount that is greater than a threshold. The approach may allow a battery to discharge a greater number of times so that battery life may be extended.

18 Claims, 4 Drawing Sheets

(56) References Cited

U.S. PATENT DOCUMENTS

2016/0153417 A1* 6/2016 Tochigi .................. F02D 29/02
                                                         123/339.24
2017/0107963 A1* 4/2017 Khafagy ............. F02N 11/0833
2018/0298863 A1* 10/2018 Kondo .................. F02N 11/084

* cited by examiner

METHODS AND SYSTEMS FOR CONTROLLING A STOP/START ENGINE

FIELD

The present description relates to a system and methods for improving vehicle drivability and fuel economy. The methods may be particularly useful for engines that are automatically stopped and restarted to conserve fuel.

BACKGROUND AND SUMMARY

A vehicle having an engine that may be automatically stopped and started may include a battery for cranking the engine and supplying electrical power to ancillary devices. If the battery is a lead-acid battery, its cycle life may be reduced by deep discharging events. However, if the depth of discharge is less significant, then the battery's cycle life may be substantially increased. The depth of discharge of the battery may be impacted by the amount of time that the engine is stopped and the load that is applied to the battery when the engine is stopped. If the engine is stopped briefly for a traffic signal, then the depth of discharge may be low. Conversely, if the engine is stopped for a longer period of time and the electrical load that is applied to the battery is high, then the depth of discharge may be significant. While it may be possible to predict the amount of time that the engine may be stopped via infrastructure to vehicle communication, such communications are often unavailable. As a result, it may be difficult to determine how long an engine may be stopped before it is automatically restarted. Consequently, the battery may be subject to deep discharge cycles from time to time.

The inventors herein have recognized the above-mentioned disadvantages and have developed a method for operating an engine, comprising: via a controller, adjusting a minimum battery state of charge threshold for automatic engine stopping responsive to a temperature of a battery; and automatically stopping an engine in response to a battery state of charge being greater than the minimum battery state of charge threshold for automatic engine stopping.

By adjusting a minimum battery state of charge threshold for automatic engine stopping responsive to a temperature of a battery, it may be possible to provide the technical result of extending a number of cycles that a battery may be discharged. In particular, adjusting the minimum battery state of charge threshold for automatic engine stopping may increase the actual total number of battery discharge cycles that a battery may tolerate by increasing the battery state of charge where automatic stopping is permitted so that the battery charge may not be drawn down to as low of a charge level during an automatic engine stop. The battery's capacity to discharge may be extended when the battery is not drawn down to very low charge levels during the automatic engine stop period.

The present description may provide several advantages. Specifically, the approach may increase battery cycling life (e.g., the ability of the battery to be at least partially drained of charge and then be recharged). In addition, the approach may also adjust the target or requested battery state of charge (SOC) so that the battery SOC may be increased during conditions where it may be more likely that the battery SOC is reduced more than may be desired during an automatic engine stop. Further, the approach may make it possible to provide a desired level of vehicle stop/start performance with a lower capacity battery.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
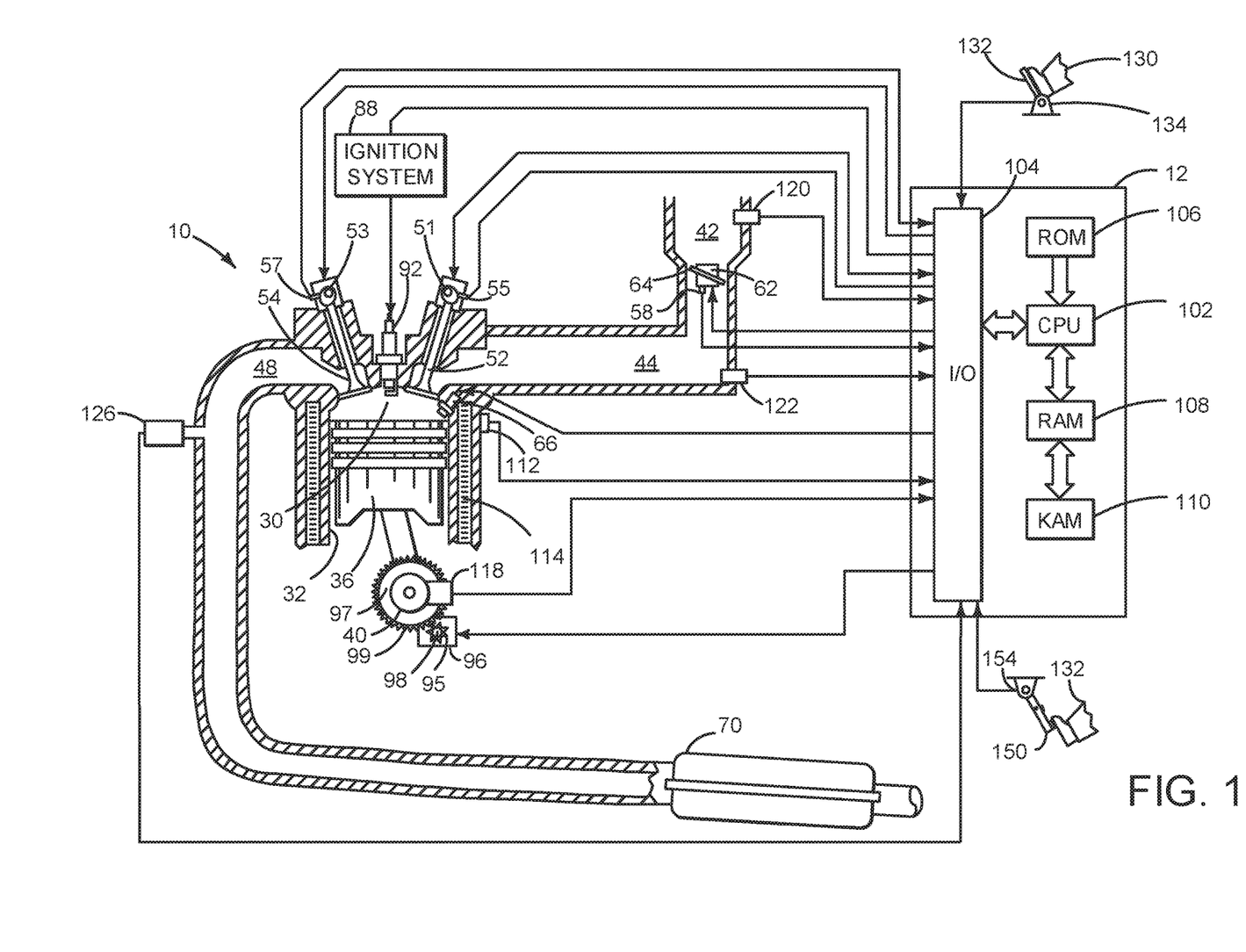
FIG. 1 is a schematic diagram of an engine.
Figure 2:
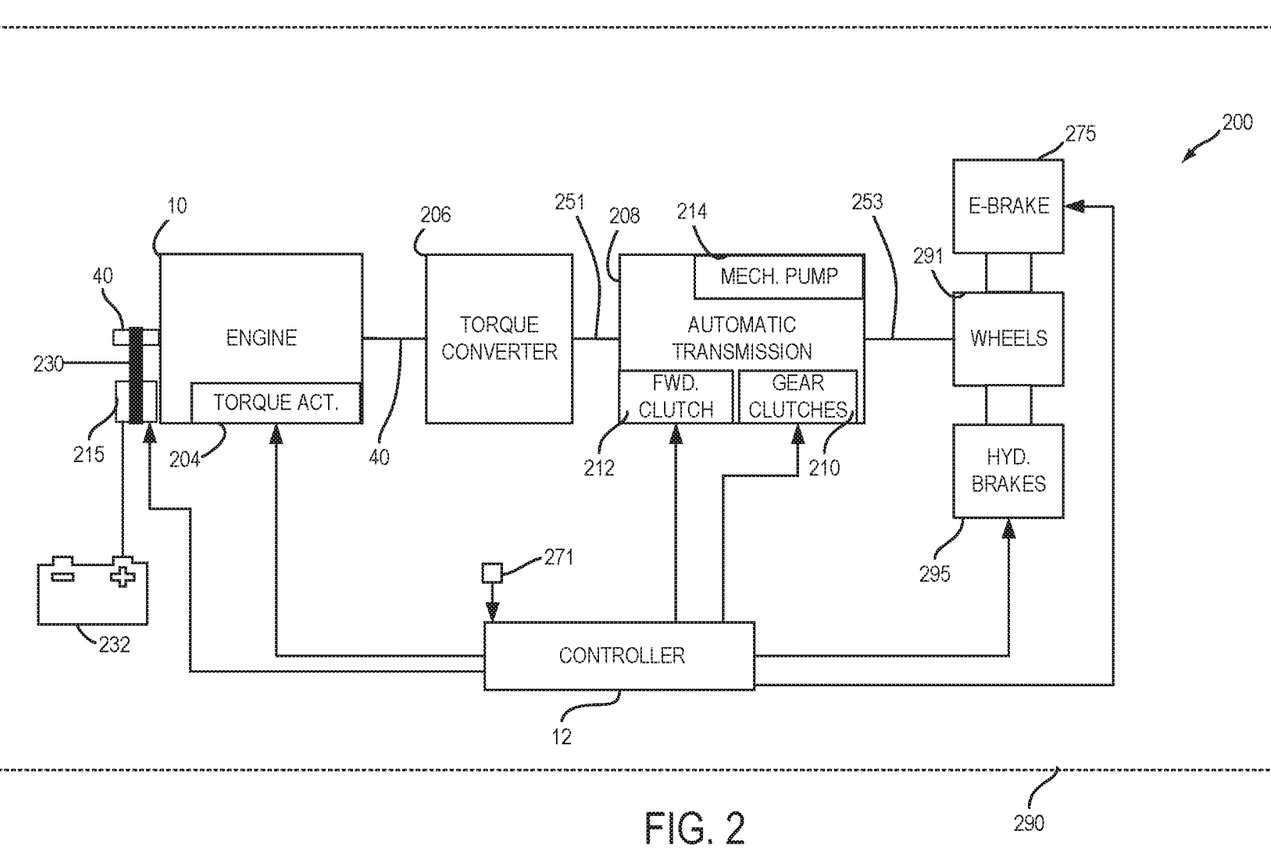
FIG. 2 shows an example vehicle driveline.
Figure 3:
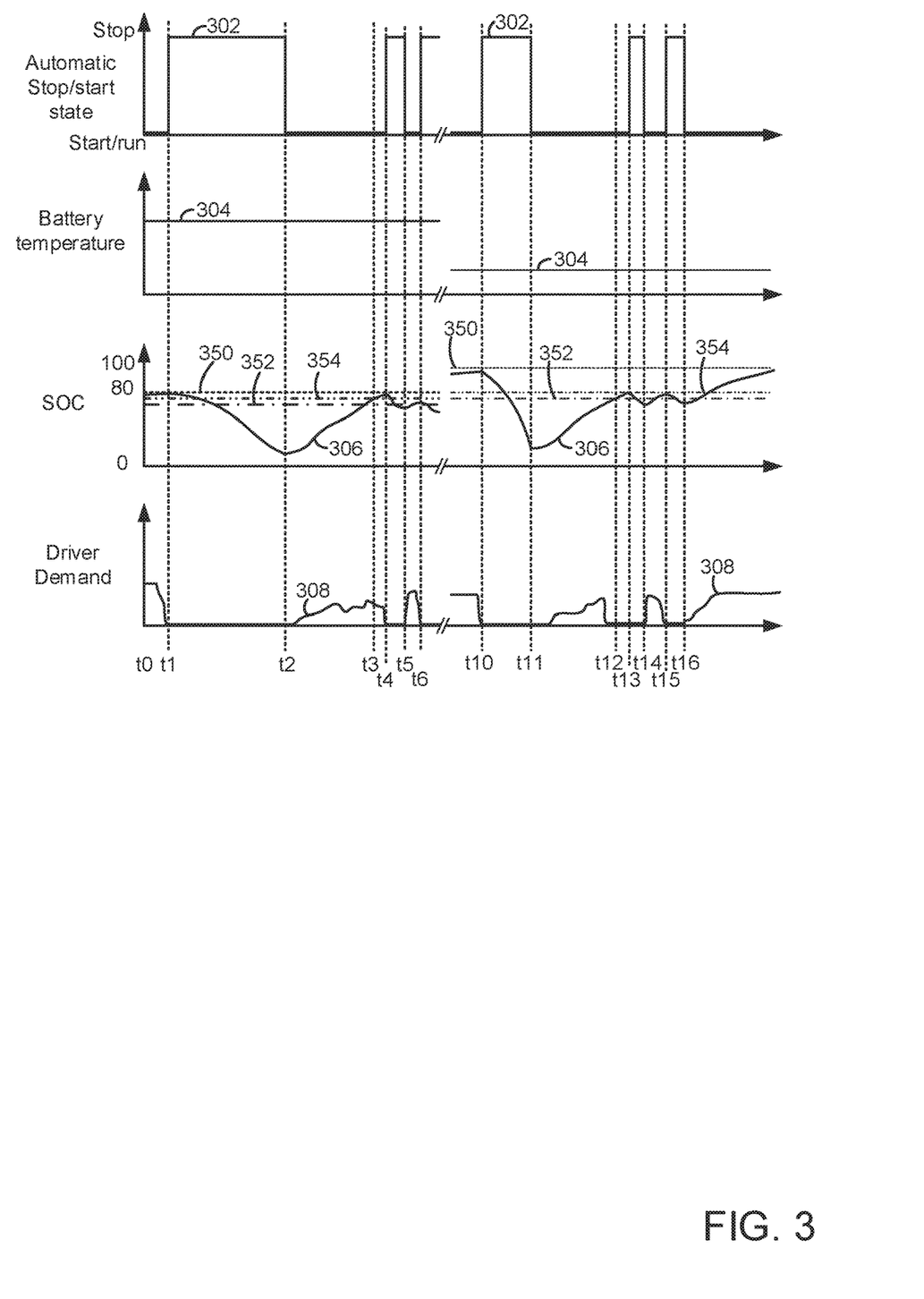
FIG. 3 is an example sequence for automatically stopping and starting an engine.
Figure 4:
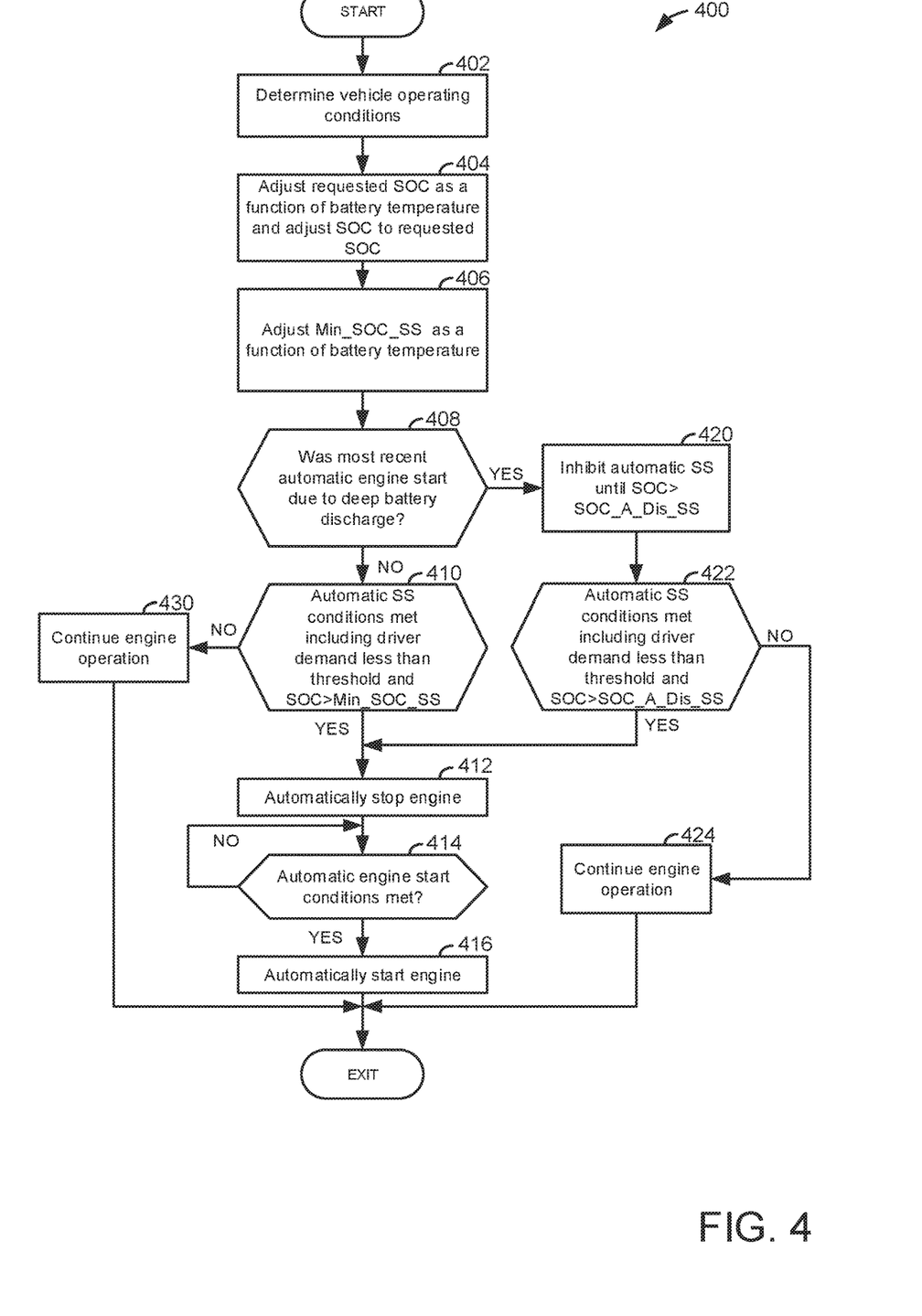
FIG. 4 is an example flowchart for operating an engine and controlling battery SOC.

The present description is related to controlling engine operation and battery SOC of a vehicle. The vehicle may include an engine as a sole source of torque for propelling the vehicle. Alternatively, the vehicle may include an engine and a motor that both supply torque to propel the vehicle. FIG. 1 shows an example engine system. The engine may be included in a driveline as shown in FIG. 2. The engine and battery may be operated according to the method of FIG. 4 to provide the operating sequence that is shown in FIG. 3. A method for operating an engine and controlling battery SOC to extend an actual total number of battery discharge cycles is shown in FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, an example vehicle driveline 200 is shown. Vehicle driveline 200 includes engine 10 as shown in greater detail in FIG. 1. Engine 10 may include one or more torque actuators 204. Torque actuator 204 may be an engine throttle, variable camshaft, fuel injector, ignition system, or other device that may affect engine torque. Engine torque may be increased or decreased via operating the torque actuator. Engine 10 may also supply mechanical torque to rotate alternator 215 to supply electrical charge to battery 232. Alternator 215 is shown coupled to crankshaft 40 via belt 230. Battery 232 may supply electrical power to rotate starter 96 shown in FIG. 1. Further, battery 232 may supply electrical power to controller 12.

Engine 10 provides torque to torque converter 206 via crankshaft 40. Torque converter 206 hydraulically couples engine 10 to transmission input shaft 251. Automatic transmission 208 includes a forward clutch 212 and gear clutches 210. Mechanical pump 214 supplies pressurized transmission fluid to torque converter 206, gear clutches 210, and forward clutch 212.

Driveshaft 253 directs torque from transmission 208 to vehicle wheels 291. Force may be supplied to vehicle wheels via hydraulic brakes 295, or optionally, electrically operated brakes 275. Electrically operated brakes 275 may be operated as parking brakes or holding brakes when vehicle 290 is desired to be held in a stopped state. Hydraulic brakes 295 may be applied while vehicle 290 is moving, is desired to be held in a stopped state, and as holding or parking brakes. Additionally, hydraulic brakes 295 and electric brake 275 may be applied when inclinometer 271 indicates a road grade greater than a threshold road grade when vehicle 290 is stopped.

Thus, the system of FIGS. 1 and 2 provides for a vehicle system, comprising: a vehicle including an engine and a battery; and a controller including non-transitory instructions executable to adjust a battery state of charge to a threshold battery state of charge that is a function of a temperature of a battery. The vehicle system further comprises additional instructions to adjusting a minimum battery state of charge threshold for automatic engine stopping responsive to the temperature of a battery. The vehicle system further comprises additional instructions to inhibit automatic engine stopping responsive to a most recent automatic engine restart being initiated in response to the battery state of charge being less than a threshold battery state of charge. The vehicle system includes where the battery state of charge is adjusted via an alternator. The vehicle system further comprises additional instructions to automatically stop the engine. The vehicle system further comprises additional instructions to automatically start the engine.

Referring now to FIG. 3, an example prophetic engine operating sequence according to the method of FIG. 4 is shown. Vertical markers t0-t16 represent times of interest during the sequence. The // marks along the horizontal axis represent a break in time and the break in time may be long or short in duration.

The first plot from the top of FIG. 3 is a plot of engine automatic stop/start operating state versus time. The vertical axis represents engine automatic stop/start operating state and the engine is automatically stopped when trace 302 is at a higher level near the vertical axis arrow. The engine is automatically started or operating when trace 302 is at a lower level. The horizontal axis represents time and time increases from the left to side of the figure to the right side of the figure. Trace 302 represents the engine automatic stop/start state.

The second plot from the top of FIG. 3 is a plot of battery temperature versus time. The vertical axis represents battery temperature and battery temperature increases in the direction of the vertical axis arrow. The horizontal axis represents time and time increases from the left to side of the figure to the right side of the figure. Trace 304 represents the battery temperature.

The third plot from the top of FIG. 3 is a plot of battery SOC versus time. The vertical axis represents battery SOC and battery SOC increases in the direction of the vertical axis arrow. The horizontal axis represents time and time increases from the left to side of the figure to the right side of the figure. Trace 306 represents the battery SOC. Dashed line 350 represents a requested or target battery SOC. Dash-dot line 352 represents a minimum battery state of charge for steady-state engine stop/start (e.g., engine stop/start when vehicle speed is zero). The engine may not be automatically stopped when battery SOC is less than threshold 352. Dash-dot-dot line 354 represents a minimum battery state of charge for steady-state engine stop/start (e.g., engine stop/start when vehicle speed is zero) after a most recent engine start was an automatic engine start and the start was generated due to a low battery SOC. The engine may not be automatically stopped when battery SOC is less than threshold 354 after the engine's most recent start was an automatic engine start due to a low battery SOC.

The fourth plot from the top of FIG. 3 is a plot of driver demand torque versus time. The vertical axis represents driver demand torque and driver demand torque increases in the direction of the vertical axis arrow. The horizontal axis represents time and time increases from the left to side of the figure to the right side of the figure. Trace 308 represents the driver demand torque. At time t0, the engine is running (e.g., rotating and combusting fuel). The battery temperature is at a higher level and the battery SOC is near the requested or target battery SOC. The driver demand torque is at a middle level. Such conditions may be present when the vehicle is moving and the engine is operating at part throttle conditions. The driver demand torque is reduced to zero before time t1 is reached. The requested or target battery SOC is 80% and the minimum battery state of charge for steady-state engine stop/start is 68%. The minimum battery state of charge for steady-state engine stop/start after a most recent engine start was an automatic engine start and the start was generated due to a low battery SOC is 75%.

At time t1, the engine is automatically stopped since the battery SOC is high and the driver demand is low. The battery temperature remains at a higher level. Between time t1 and time t2 the battery SOC is reduced via electrical loads (e.g., radio, navigation, lights, etc.) that are applied to the battery. The driver demand torque remains zero and the engine remains stopped.

At time t2, the engine is automatically started in response to a low battery SOC. The battery temperature remains at a higher level and the driver demand torque is zero. Between time t2 and time t3, the driver demand increases and the battery SOC increases. At time t3, the battery SOC is greater than threshold 354, but the engine is not automatically stopped because driver demand is at a middle level. The driver demand falls to a low value, so the engine is automatically stopped at time t4. The battery SOC is reduced by a small amount after the engine is stopped between time t4 and time t5. The driver demand torque is increased at time t5, so the engine is automatically started. The battery SOC is increased after the engine is automatically started, and then the engine is automatically stopped after driver demand torque returns to zero at time t6. There is a break in time between time t6 and time t10.

Before time t10, the engine is running (e.g., rotating and combusting fuel). The battery temperature is at a lower level and the battery SOC is near the requested or target battery SOC. The driver demand torque is at a middle level. Such conditions may be present when the vehicle is moving and the engine is operating at part throttle conditions. The driver demand torque is reduced to zero before time t10 is reached. The requested or target battery SOC is 100% and the minimum battery state of charge for steady-state engine stop/start is 75%. The minimum battery state of charge for steady-state engine stop/start after a most recent engine start was an automatic engine start and the start was generated due to a low battery SOC is 80%.

At time t10, the engine is automatically stopped since the battery SOC is high and the driver demand is low. The battery temperature remains at a lower level. Between time t10 and time t11 the battery SOC is reduced via electrical loads (e.g., radio, navigation, lights, etc.) that are applied to the battery. The driver demand torque remains zero and the engine remains stopped.

At time t11, the engine is automatically started in response to a low battery SOC. The battery temperature remains at a lower level and the driver demand torque is zero. Between time t11 and time t12, the driver demand increases and the battery SOC increases. Near time t12 the driver demand torque is reduced to zero. The battery SOC continues to increase since the engine is running and it becomes greater than threshold 352 at time t12, but the engine is not automatically stopped because battery SOC has not exceeded threshold 354 and because the most recent engine restart was due to a low battery SOC.

At time t13, the battery SOC is greater than threshold 354 and the driver demand is zero, so the engine is automatically stopped. The battery temperature remains low and the battery SOC begins to decrease after time t13. Driver demand increases at time t14 and the engine is automatically started in response to the increase in driver demand torque. The battery temperature remains low.

At time t15, the driver demand is zero and the battery SOC is above threshold 352, so the engine is automatically stopped. The battery temperature remains low. The engine is automatically restarted at time t16 in response to an increase in driver demand torque. The battery SOC remains low.

In this way, the method of FIG. 4 may adjust automatic engine stopping thresholds responsive to battery temperature so that the possibility of deep battery discharges may be reduced. By reducing the possibility of deep battery discharges, it may be possible to increase an actual total number of battery discharges before battery degradation occurs.

Referring now to FIG. 4, a method for operating an engine is shown. The method of FIG. 4 may be stored as executable instructions in controller 12 for the system of FIGS. 1 and 2. Further, the method of FIG. 4 may provide the example sequence shown in FIG. 3.

At 402, method 400 determines vehicle operating conditions. Vehicle operating conditions may include, but are not limited to engine speed, engine load, battery state of charge, vehicle speed, and driver demand torque. In one example, driver demand torque may be determined from a table of empirically determined driver demand torques that are referenced or indexed via vehicle speed and accelerator pedal position. Method 400 proceeds to 404.

At 404, method 400 adjusts a requested or target battery SOC as a function of battery temperature. The battery SOC may be increased via adjusting output of an alternator. In one example, the requested battery SOC is adjusted based on the following table:

| Battery temperature, Degrees C. | Req_SOC |
|---|---|
| −10 | 100 |
| −5 | 100 |
| 0 | 85 |
| 20 | 80 |
| 55 | 80 | where Req_SOC is the requested battery SOC. Thus, the requested battery SOC may be expressed as Req_SOC=f (batt temp), where Req_SOC is the requested battery SOC, f is a function that returns a value based on battery temperature, and batt temp is battery temperature. The requested battery SOC may be provided via adjusting output of an alternator (e.g., adjusting alternator field current). Method 400 proceeds to 406 after determining and requesting the battery SOC.

At 406, method 400 adjusts a minimum battery SOC (e.g., an engine is not automatically stopped when a battery SOC is less than the battery SOC threshold) for automatic engine stopping as a function of battery temperature. In one example, the minimum battery SOC threshold is adjusted based on the following table:

| Battery temperature, Degrees C. | Min_SOC_SS |
|---|---|
| −10 | 100 |
| −2 | 75 |
| 0 | 73 |
| 7 | 68 |
| 25 | 68 | where Min_SOC_SS is a minimum battery SOC for automatic engine stopping. Thus, the requested battery SOC may be expressed as Min_SOC_SS=f(batt temp), where Min_SOC_SS is a minimum battery SOC for automatic engine stopping, f is a function that returns a value based on battery temperature, and batt temp is battery temperature. Method 400 proceeds to 408 after determining the minimum battery SOC for automatic engine stopping.

At 408, method 400 judges if a most recent automatic engine start due to deep battery discharge. In other words, if the most recent engine restart was performed in response to a deep battery SOC discharge after the engine was automatically stopped, then it may be judged that the most recent engine start was due to a battery discharge greater than a threshold.

Alternatively, or in addition method 400 may judge if a most recent engine start was an automatic engine start (e.g., an engine restart that is not performed in response to a human driver requesting an engine start via an input, such as a key switch, that is dedicated solely to starting the engine responsive to human driver input) after a manual engine restart (e.g., an engine start that is performed in response to a human driver requesting an engine start via a pushbutton, key switch, or voice command) due to a deep battery discharge. In other words, if the most recent engine restart was performed in response to a low battery SOC after the engine was automatically stopped, then it may be judged that the most recent engine start was due to a deep battery discharge (e.g., low battery SOC).

If method 400 judges that the most recent engine start was an automatic engine start due to deep battery SOC discharge, or alternatively, the most recent engine start was an automatic engine start after a manual engine restart due to a deep battery discharge, then the answer is yes and method 400 proceeds to 420. Otherwise, the answer is no and method 400 proceeds to 410. At 410, method 400 judges if automatic engine stop/start conditions have been met including driver demand torque being less than a threshold torque and battery SOC being greater than Min_SOC_SS. Automatic engine stop/start conditions may include a brake pedal being applied and vehicle speed being less than a threshold speed. If so, the answer is yes and method 400 proceeds to 412. Otherwise, the answer is no and method 400 proceeds to 430. In addition, if the answer is yes, the prohibition of automatic engine stopping may be withdrawn.

At 412, method 400 automatically stops the engine without the human driver specifically requesting an engine stop. In one example, the engine is stopped via ceasing to supply fuel to the engine. Method 400 proceeds to 414.

At 414, method 400 judges if conditions are present for automatic engine starting. Conditions for automatic engine starting may include, but are not limited to battery SOC less than a threshold SOC, battery SOC drainage amount greater than a threshold amount (e.g., greater than 2% of battery SOC being drained), driver demand torque greater than a threshold torque, engine temperature less than a threshold temperature, and catalyst temperature less than a threshold temperature. If method 400 judges that conditions are present for an automatic engine start, then the answer is yes and method 400 proceeds to 416. Otherwise, the answer is no and method 400 returns to 414.

At 416, method 400 automatically starts the engine. The engine is started via cranking the engine via a starter and supplying fuel to the engine. Spark may also be supplied to the engine. Method 400 starts the engine and proceeds to exit.

At 420, method 400 inhibits or prevents automatic engine stopping until battery SOC is greater than threshold SOC_A_Dis_SS. The value of SOC_A_Dis_SS is greater than a value of Min_SOC_SS so that once the engine is started responsive to a deep battery discharge or drawdown, then additional charge has to be drawn from the battery to get the engine to be restarted in response to low battery charge. Consequently, increasing the SOC threshold may reduce the possibility of battery degradation that may be related to discharging the battery to a low charge level. Method 400 proceeds to 422.

At 422, method 400 judges if automatic engine stop/start conditions have been met including driver demand torque being less than a threshold torque and battery SOC being greater than SOC_A_Dis_SS. If so, the answer is yes and method 400 proceeds to 412. Otherwise, the answer is no and method 400 proceeds to 424. In addition, if the answer is yes, the prohibition of automatic engine stopping may be withdrawn.

At 424, the engine continues to operate (e.g., rotate and combust fuel) so that the engine may supply power to charge the battery via the alternator. The alternator delivers charge to the battery so that battery SOC may match the requested or target battery SOC. Method 400 proceeds to exit.

At 430, the engine continues to operate (e.g., rotate and combust fuel) so that the engine may supply power to charge the battery via the alternator. The alternator delivers charge to the battery so that battery SOC may match the requested or target battery SOC. Method 400 proceeds to exit.

In this way, the method of FIG. 4 adjusts automatic engine stopping battery SOC thresholds so that the possibility of battery degradation may be reduced. Further, the thresholds may be adjusted according to battery operating properties that may be related to battery temperature to improve battery life.

Thus, the method of FIG. 4 provides for a method for operating an engine, comprising:

via a controller, adjusting a minimum battery state of charge threshold for automatic engine stopping responsive to a temperature of a battery; and automatically stopping an engine in response to a battery state of charge being greater than the minimum battery state of charge threshold for automatic engine stopping. The method includes where the minimum battery state of charge threshold is increased in response to the temperature of the battery decreasing. The method includes where the minimum battery state of charge threshold is decreased in response to the temperature of the battery increasing.

In some examples, the method includes where the engine is automatically stopped in further response to driver demand being less than a threshold and a brake pedal being applied. The method includes where the minimum battery state of charge threshold for automatic engine stopping is a threshold to which the battery state of charge is compared to enable the automatic stopping of the engine. The method further comprises preventing automatic stopping of the engine in response to the battery state of charge being less than the minimum battery state of charge threshold for automatic engine stopping. The method includes where the engine is automatically stopped via ceasing fuel delivery to the engine via the controller.

The method of FIG. 4 also provides for a method for operating an engine, comprising: via a controller, inhibiting automatic engine stopping responsive to a most recent automatic engine restart being initiated in response to a battery state of charge drainage amount (e.g., reduction in SOC) being greater than a threshold. The method further comprises canceling the inhibiting automatic engine stopping in response to the battery state of charge drainage amount being greater than a threshold that is based on the most recent automatic engine restart being initiated in response to a battery state of charge drainage amount being greater than the threshold. The method further comprises adjusting a minimum battery state of charge threshold for automatic engine stopping responsive to a temperature of a battery. The method further comprises automatically stopping an engine in response to a battery state of charge being greater than the minimum battery state of charge threshold for automatic engine stopping. The method further comprises adjusting the battery state of charge to a threshold battery state of charge that is a function of battery temperature. The method includes where the threshold battery state of charge increases as battery temperature decreases. The method includes where the threshold battery state of charge decreases as battery temperature increases.

In another representation, the method of FIG. 4 also provides for a method for operating an engine, comprising: via a controller, inhibiting automatic engine stopping responsive to a most recent automatic engine restart being initiated in response to a battery state of charge being less than a threshold. The method further comprises canceling the inhibiting automatic engine stopping in response to the battery state of charge being greater than a threshold that is based on the most recent automatic engine restart being initiated in response to a battery state of charge being less than a threshold. The method further comprises adjusting a minimum battery state of charge threshold for automatic engine stopping responsive to a temperature of a battery. The method further comprises automatically stopping an engine in response to a battery state of charge being greater than the minimum battery state of charge threshold for automatic engine stopping. The method further comprises adjusting the battery state of charge to a threshold battery state of charge that is a function of battery temperature. The method includes where the threshold battery state of charge increases as battery temperature decreases. The method includes where the threshold battery state of charge decreases as battery temperature increases.

As will be appreciated by one of ordinary skill in the art, method described in herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system. This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
via a controller, adjusting a first threshold responsive to a temperature of a battery;
inhibiting automatic engine stopping while a battery state of charge is less than a second threshold; and automatically stopping the engine in response to the battery state of charge being greater than the second threshold when a most recent automatic engine restart was performed in response to the battery state of charge, and automatically stopping the engine in response to the battery state of charge being greater than a first threshold when the most recent automatic engine restart was not performed responsive to the battery state of charge, where the first threshold is less than the second threshold.

2. The method of claim 1, where the first threshold is a minimum battery state of charge threshold that is increased in response to the temperature of the battery decreasing.

3. The method of claim 2, where the minimum battery state of charge threshold is decreased in response to the temperature of the battery increasing.

4. The method of claim 1, where the engine is automatically stopped in further response to driver demand being less than a threshold and a brake pedal being applied.

5. The method of claim 1, where the first threshold is a threshold to which the battery state of charge is compared to enable an automatic stopping of the engine.

6. The method of claim 1, further comprising continuing operation of the engine in response to the battery state of charge being less than the second threshold.

7. The method of claim 1, where the engine is automatically stopped via ceasing fuel delivery to the engine via the controller.

8. A method for operating an engine, comprising:
via a controller, automatically stopping the engine in response to a battery state of charge being greater than a second threshold when a most recent automatic engine restart was performed responsive to the battery state of charge, and automatically stopping the engine in response to the battery state of charge being greater than a first threshold when the most recent automatic engine restart was not performed responsive to the battery state of charge.

9. The method of claim 8, where the first threshold is a minimum battery state of charge threshold, and further comprising:
adjusting the minimum battery state of charge threshold responsive to a temperature of a battery.

10. The method of claim 9, further comprising continuing operation of the engine in response to the battery state of charge being greater than the first threshold.

11. The method of claim 8, where the first threshold and the second threshold are less than a target state of charge, and further comprising:
adjusting the first threshold as a function of battery temperature.

12. The method of claim 11, where the first threshold increases as battery temperature decreases.

13. The method of claim 12, where the first threshold decreases as battery temperature increases.

14. A vehicle system, comprising:
a vehicle including an engine and a battery; and
a controller including non-transitory instructions executable to adjust a battery state of charge to a threshold battery state of charge that is a function of a temperature of a battery, and instructions for automatically stopping the engine in response to the battery state of charge being greater than a second threshold when a most recent automatic engine restart was performed responsive to the battery state of charge, and automatically stopping the engine in response to the battery state of charge being greater than a first threshold when the most recent automatic engine restart was not performed responsive to the battery state of charge.

15. The vehicle system of claim 14, further comprising additional instructions for adjusting the first threshold for automatic engine stopping responsive to the temperature of a battery.

16. The vehicle system of claim 14, where the battery state of charge is adjusted via an alternator.

17. The vehicle system of claim 14, further comprising additional instructions to inhibit stopping of the engine.

18. The vehicle system of claim 17, further comprising additional instructions to automatically start the engine.

* * * * *